Patented Dec. 1, 1936

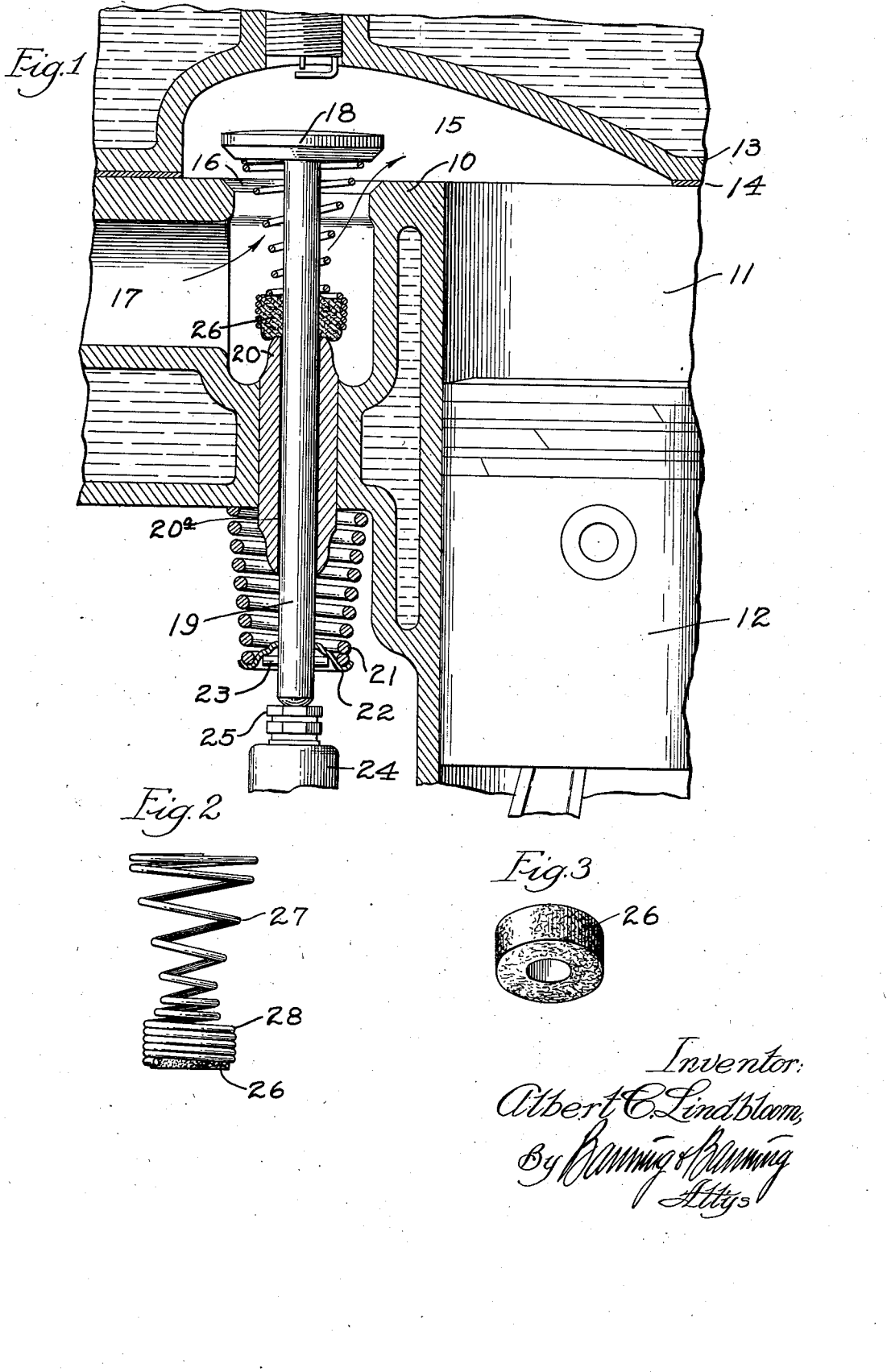

2,062,518

UNITED STATES PATENT OFFICE 2,062,518

VALVE STEM PACKING

Albert C. Lindbloom, Chicago, Ill., assignor to Lindbloom Auto Parts Company, Chicago, Ill., a corporation of Illinois Application July 20, 1934, Serial No. 736,148

1 Claim. (Cl. 286—30)

An object of this invention is to provide an improved form of packing for the intake valve stems of internal combustion engines.

This and other objects as will hereinafter appear are accomplished by this invention which is fully described in the following specification and shown in the accompanying drawing, in which—

Figure 1 is a fragmentary vertical section through the cylinder of an automobile engine showing the intake valve stem with the packing applied thereto;

Fig. 2 is a side elevation of the packing consisting of a washer and its spring; and Fig. 3 is a perspective view of the felt washer alone.

The embodiment illustrated in Fig. 1 comprises a cylinder block 10 having a cylinder 11 in which is slidably fitted a piston 12. A cylinder head 13 is secured above the cylinder block in any well known manner with a gasket 14 held therebetween. The cylinder head has a combustion space 15 communicating at one end with the top of the cylinder, and communicating through the valve seat 16 with an intake passage 17 which leads to the intake manifold in any well known manner.

The valve seat 16 is closed by means of a poppet valve 18 having a stem 19 journaled in a valve stem guide 20. The valve is normally held seated by means of a compression spring 21 surrounding the lower end of the valve stem and bearing upon the plate 22, which is held in place by means of a pin 23 in a manner well known to this art. A valve tappet 24 is guided to move parallel to the stem 19, and is located directly beneath the same and has an adjusting screw 25 which bears upon the underside of the valve stem to lift the same during the suction stroke of the engine.

The foregoing description is typical of an internal combustion engine of the L-head poppet valve type. An engine of this type has a very great tendency to wear the passage 20ª in the stem guide 20, as well as the stem itself, so that after the engine has been in operation for some time the space between the stem and the stem guide is often very considerable. Inasmuch as the intake passage 17 is often under a high degree of vacuum, particularly when the engine is idling, and since the space surrounding the spring 21 is at atmospheric pressure great quantities of air are drawn in through this space. This has the effect (1) of upsetting carburetion and particularly of introducing air into the mixture unmixed with the same just before it enters the cylinder; and (2) it draws oil from around the stem 19 and delivers that to the cylinder frequently in large quantities.

To overcome these I have provided a washer 26 which tightly fits around the upper portion of the valve stem and rests upon the upper end of the valve stem guide, and is held down against the guide by means of a helical wire spring 27 which has an enlarged upper end which bears against the underside of the valve 18, while the lower end of the spring is enlarged at 28 to enclose the washer 26. By this arrangement the cup for enclosing the washer and the spring for pressing the washer against the end of the valve stem guide is an integral structure, so that the number of parts required to supply packing for each valve is reduced to two, namely, the washer and the spring. The washer used in this case is made from a very superior wool felt heavily impregnated with graphite and oil to insure long life for the washer. The vacuum in the passage 17 ensures that whatever flow of air there is through the passage 20ª will be upward, thereby insuring a small but constant flow of oil up the valve stem to the washer 26 while the engine is in operation. The necked-in center of the spring may closely surround the valve stem so as to act to further insure that the spring will maintain its proper position on the valve.

Thus it will be seen that this arrangement provides a simple method of insuring against heavy wear between the intake valve stem and its guide in the case of new engines, and for stopping the heavy flow of air and oil past the valve stem in case of those engines which have been in use for some time.

While I have shown and described but a single embodiment of my invention, it is to be understood that it is capable of many modifications. Changes, therefore, in the construction and arrangement may be made which do not depart from the spirit and scope of the invention as disclosed in the appended claim.

I claim:

A packing for intake valve stem of internal combustion engines comprising a felt-like material adapted to closely surround said valve stem, and a spring consisting of a single piece of coiled wire having one end adapted to bear against the head of the valve while the opposite end is formed to provide a cup to enclose the felt and to press the same about the valve stem the central portion being gradually reduced in diameter to a point near the cup.

ALBERT C. LINDBLOOM.